Nov. 30, 1965  A. L. DEUSCHEL  3,220,703
HOMOGENIZER
Filed April 2, 1962  2 Sheets-Sheet 1
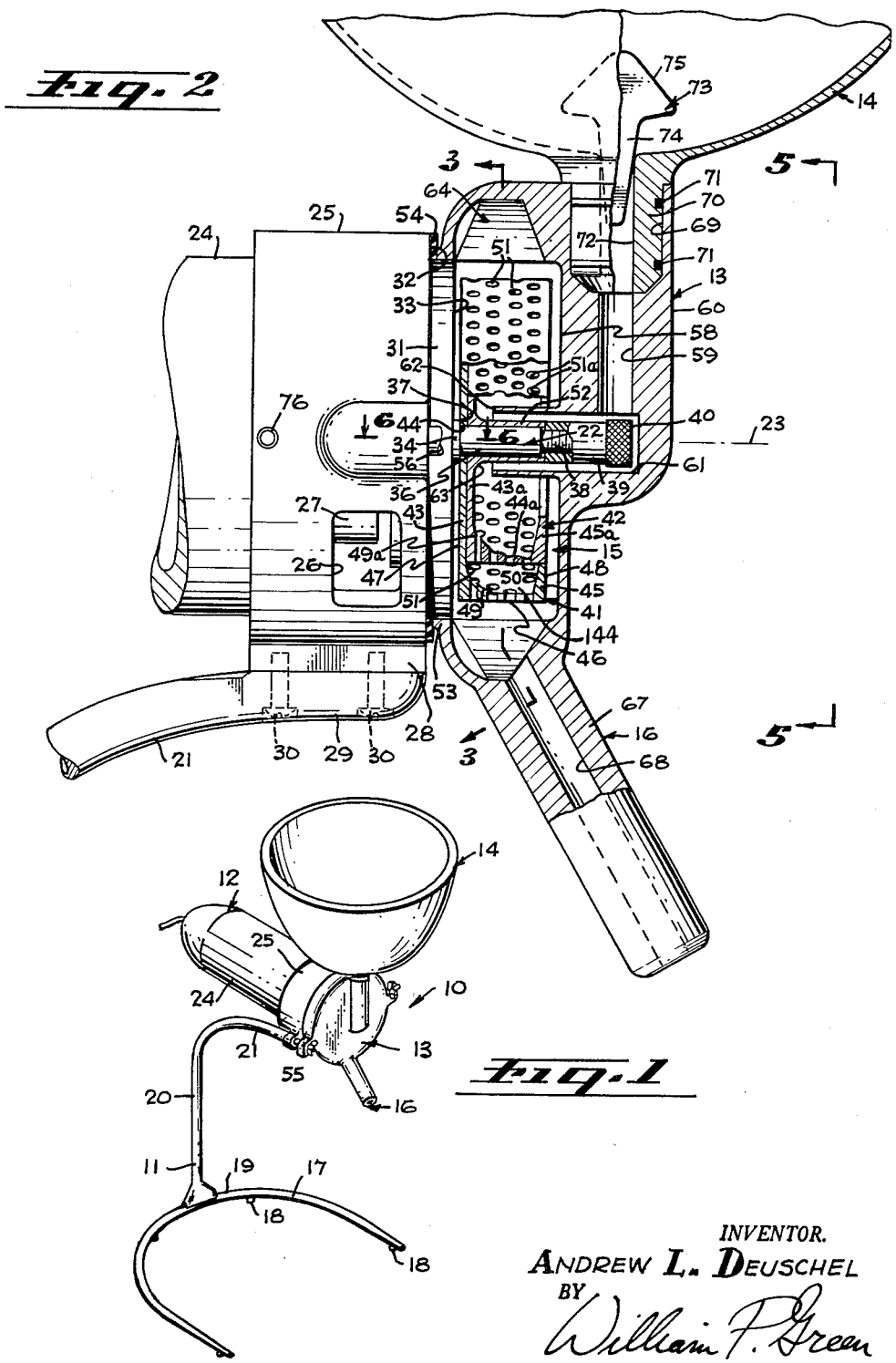
INVENTOR.
ANDREW L. DEUSCHEL
BY
William P. Green
ATTORNEY

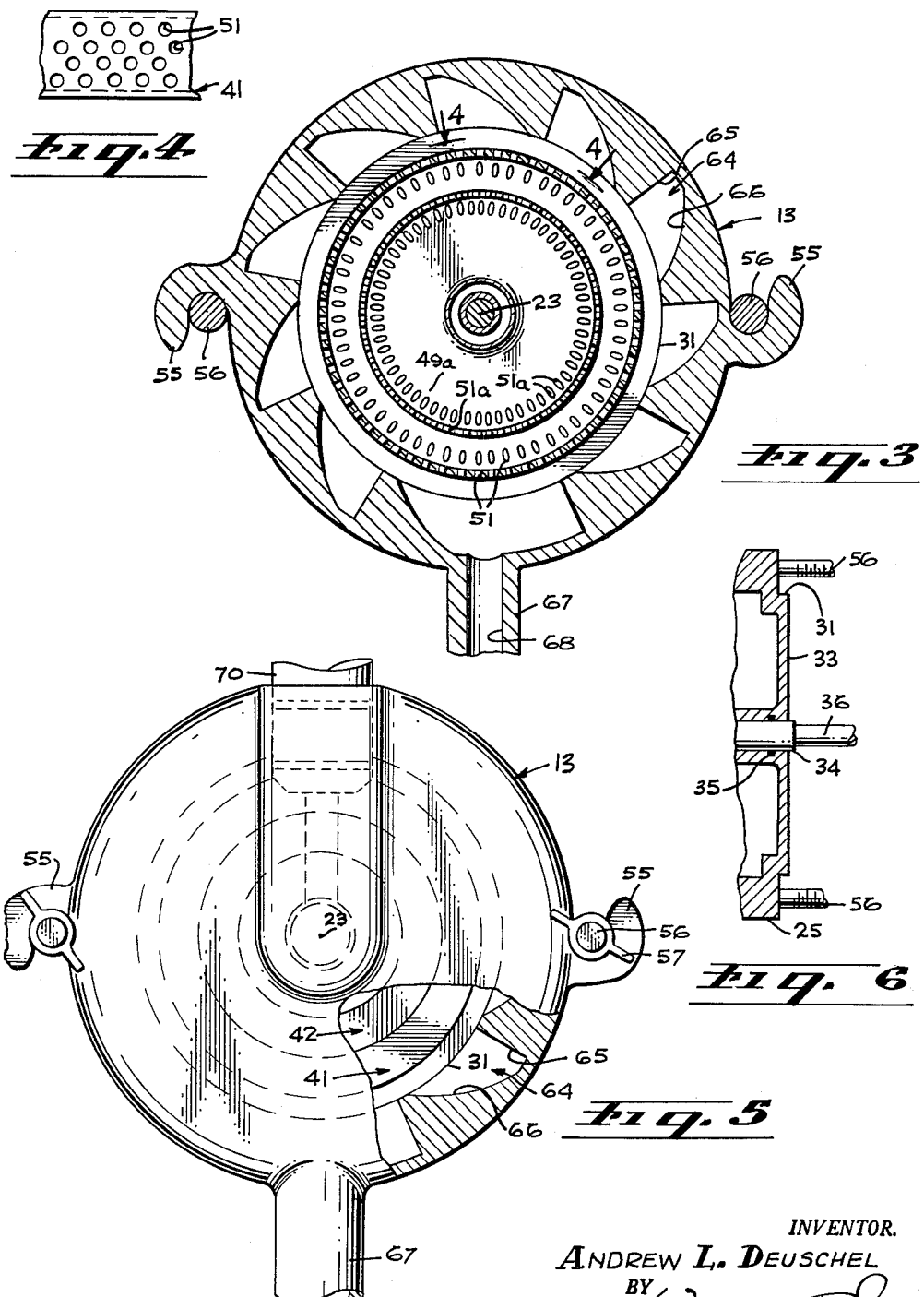

United States Patent Office 3,220,703
Patented Nov. 30, 1965

3,220,703
HOMOGENIZER
Andrew L. Deuschel, 232½ S. Sadler Ave.,
Los Angeles 22, Calif.
Filed Apr. 2, 1962, Ser. No. 184,464
10 Claims. (Cl. 259—10)

This invention relates to improved apparatus for homogenizing a liquid mixture of two or more substances, by very high speed agitation of the mixture in a manner subdividing the constituents of the mixture to an extremely finely divided and intimately intermixed form. Apparatus embodying the invention is usable for such purposes as reconstituting whipping cream or milk, or homogenizing salad dressing, soup bases, fruit juices, bread ingredients and the like.

Conventional homogenizers which are currently on the market are so designed that they must be relatively large in size, and therefore rather expensive, with the result that many establishments which would otherwise have use for a homogenizer have not found it economically practical to purchase one. A major object of the present invention is therefore, to provide a homogenizer which is structurally much simpler than prior homogenizing devices, so that it may be used in small bakeries, individual restaurants, homes, and many other places where conventional homogenizers could not possibly be provided.

Further contemplated is a homogenizer which is so designed as to effect a much more thorough intermixture of the constituents of the liquid mixture, and a more effective subdivision of those constituents into finely divided form, than has been attained in prior devices. At the same time, a unit embodying the invention is so constructed that those portions of the device which touch food products can be very easily and quickly disassembled, in a manner allowing ready access to all of these parts for thorough cleaning. As will appear, only a very few parts of the device ever touch the food products being handled, and these parts are in most cases relatively small in size, and easily disassembled to conditions in which their interiors are accessible for cleaning.

Structurally, a device embodying the invention includes a rotor which is driven by an electric motor at an extremely high rate of speed, and which functions in operation to agitate and intimately mix the constituents of a liquid mixture. Certain features of the invention have to do with a unique manner of feeding this liquid to a location near the center of the rotor, with the liquid then being thrown radially outwardly through apertures in the rotor by centrifugal forces. As the liquid passes through these apertures, it forms finely divided jets which impinge against an outer wall of the device, to attain the desired minute subdivision of the constituents. The liquid is desirably fed to the apparatus by gravity, and after being homogenized flows by gravity from the rotor chamber to a collection chamber or receptacle. The liquid may be fed into the unit from an upper supply bowl or hopper, which may be connected to the body of the device by an easily detachable connection. The rotor itself desirably has two radially spaced walls both of which contain apertures of the previously discussed type, through which the liquid is thrown, to attain a dual homogenizing action serving to maximize the overall homogenizing effect.

The above and other features and objects of the present invention will be better understood from the following detailed description of the typical embodiment illustrated in the accompanying drawings, in which:

FIG. 1 is a perspective view showing a homogenizer constructed in accordance with the invention;

FIG. 2 is an enlarged fragmentary side view of a portion of the homogenizer, partially shown in vertical section;

FIG. 3 is a transverse section taken on line 3—3 of FIG. 2;

FIG. 4 is a developed view taken on line 4—4 of FIG. 3;

FIG. 5 is a front elevation, partially broken away, taken primarily on line 5—5 of FIG. 2; and FIG. 6 is a section taken on line 6—6 of FIG. 2.

With reference first to FIG. 1, the homogenizer 10 illustrated in that figure includes a stand 11 adapted to be mounted on a suitable support surface, and carrying a motor 12 at its upper end. To the forward end of the motor, there is removably mounted a body part 13, to which there is detachably connected a bowl 14 for receiving the liquids to be homogenized. These liquids flow through the interior of body 13, and are homogenized within that body by a rotor assembly 15 (FIG. 2) driven by the motor, to ultimately discharge by gravity through a spout 16 into a suitable receptacle placed on the same support surface as is stand 11.

The stand may have a bottom U-shaped portion 17 lying in essentially a horizontal plane, and having short feet or cushions 18 for engaging the support surface. At the center of the rear cross-piece portion 19 of element 17, the stand includes an upstanding frame member 20, which projects upwardly and then curves forwardly at 21 to carry the motor. Parts 17 and 20 are rigid, and may be formed of a suitable metal such as aluminum.

Motor 12 is a high speed motor, typically turning at about 10,000 r.p.m., and has a shaft 22 (FIG. 2) projecting from its forward end and turning about a main horizontal axis 23 of the unit. The housing 24 of the motor may be cylindrical and horizontally elongated, as shown, and centered about motor axis 23. At its forward end, housing 24 may have a somewhat enlarged diameter portion 25, also centered about axis 23, and containing apertures 26 at its underside for passing cooling air to a fan 27 driven by shaft 22 for cooling the inner parts of the motor. There may be two of these apertures 23 at opposite sides of portion 25 of the motor housing, with this portion 25 having a mounting lug 28 at its underside between the two apertures 26 for connection to the end portion 29 of element 21 by a pair of screws 30. Thus, the motor is attached rigidly to the stand, in fixed position relative thereto.

At the front end of portion 25 of the motor housing, this housing portion has a short reduced diameter cylindrical external surface 31, centered about axis 23. At the inner end of surface 31, there is an annular shoulder or surface 32, extending transversely of axis 23, and extending radially outwardly from surface 31. At 33, the housing has a circular planar surface which extends directly transversely of axis 23, and closes the entire end of the housing except at the location of shaft 22, whose portion 34 extends through a central circular opening in the transverse end wall on which surface 33 is formed, and is a close fit within that opening. Desirably, portion 34 of the shaft is sealed with respect to the end wall of the housing, as by a suitable seal ring 35 (FIG. 6) disposed about the shaft, to prevent the flow of any food products along shaft 22 into the interior of the motor housing.

Rotor 15 may be mounted about an externally cylindrical portion 36 of shaft 22, of a diameter somewhat less than portion 34 to provide an annular transverse shoulder on the shaft at 37. Axially beyond portion 36, the shaft has a portion 38 of even smaller diameter, which portion is externally threaded to receive a somewhat elongated nut 39, which may be externally knurled at 40 for easy manual application to and removal from the end of the shaft.

The rotor is desirably formed of two parts 41 and 42. The first of these parts forms a circular disk or wall 43 extending transversely of axis 23 and containing a central aperture 44 through which shaft 22 projects, so that wall 43 abuts axially against, and is located by, shoulder 37. At the periphery of wall 43, part 42 has an axially extending wall 144, which carries at the opposite axial side of the rotor an inwardly projecting annular flange 45. The radially outer surface 46 of wall 144 may be of straight cylindrical configuration, and centered about axis 23. The axially outer surfaces 47 and 48 of walls 43 and 45 are desirably planar and disposed directly transversely of axis 23. Within the interior of rotor part 41, wall 43 has a surface extending directly transversely of axis 23, and wall 144 has a surface extending directly axially, but with these two surfaces merging together at an annular surface 49 which curves progressively as it changes from a radially extending surface to a horizontally extending surface. Desirably, this smoothly curving surface 49 is of arcuate cross-section. The inner side of the wall 45 may have a surface 50 which extends essentially radially, but at a slight angle to a true radius, to progressively diverge away from surface 48 as surfaces 48 and 50 advance outwardly.

Liquid from within the interior of the compartment formed by rotor part 41 is thrown centrifugally outwardly from that compartment through a large number of very small apertures 51 formed in wall 144 of part 41. These apertures desirably extend directly radially outwardly with respect to axis 23. Also, it is found desirable that some of the apertures 51 extend through wall 144 at the location of the annular progressively curving corner surface 49 within the rotor. Others of the apertures may extend through the portion of the wall having a straight cylindrical inner surface.

The second rotor part 42 may be considered as basically a duplicate of element 41, except that part 42 is of a smaller diameter, to fit within part 41. More specifically, inner part 42 has walls 43a, 44a and 45a corresponding to walls 43, 44 and 45 of part 41, but wall 44a is of a diameter considerably smaller than wall 44, and is spaced radially therefrom, as will be apparent from FIG. 2. The periphery of part 42 may be a close fit within the inner circular edge of wall 45 of part 41. Also, at the juncture of walls 43a and 44a, part 42 has an annular surface of progressively curving and desirably arcuate cross-section, corresponding to that designated as curving surface 49 of part 41. At the radially inner edge of wall 43a, part 42 has a tubular mounting portion 52 which is a close fit on portion 36 of shaft 22. As will be apparent, both of the parts 41 and 42 can be easily removed from and replaced on shaft 22, and are retainable in their FIG. 2 active positions on the shaft by means of nut 39. Wall 44a of part 42 has the same type of apertures as are provided on wall 44 at 51.

The previously mentioned housing part 13 is disposed about and encloses rotor 15, to form a homogenizing chamber within which the rotor turns. For this purpose, the housing part 13 is hollow, and has an annular lip 53 which is received about surface 31 of the motor housing, and abuts annularly against a seal ring 54, to form a fluid-tight seal between part 13 and portion 25 of the motor housing. Part 13 is tightened against seal ring 54, and held in position, by means of two generally hook-shaped mounting lugs 55 which project laterally from part 13 and receive two parallel screws or studs 56 mounted to motor housing part 25. Screws 56 may extend parallel to axis 23, and carry wing nuts 57 by which the part 13 is removably secured to the motor housing. The ends of the two mounting lugs 55 project in the same direction circularly about axis 23, that direction being the opposite of the direction in which motor shaft 22 turns, so that the rotation of the shaft can not turn part 13 relative to the motor. In the drawings, it may be assumed that the motor and rotor turn in a counterclockwise direction as viewed in FIGS. 3 and 4, and therefore the lugs 55 have their ends projecting in a counterclockwise direction.

At the axially outer side of rotor 15, part 13 has a transversely extending end wall presenting an inner planar transverse surface 58 disposed parallel to and spaced from the previously mentioned surface 33. Rotor 15 is then located axially between these two surfaces 33 and 58. The liquid mixture to be homogenized flows downwardly through a vertical passage 59 formed in an outwardly projecting portion 60 of the end wall of part 13, which passage communicates at its lower end with a horizontally extending cylindrical passage 61, into which shaft 22 and nut 39 project. Passage 61 is centered about axis 23, and continues through a tubular extension 62 of part 13, which projects axially beyond wall surface 58, and into the interior of the two rotor sections. Projection 62 terminates in a transverse end surface which is located in fairly close proximity to wall 43a of rotor section 42. Passage 61 is of a diameter larger than the external diameter of rotor hub portion 52 and nut 39, so that the liquid to be homogenized has an annular passage about elements 52 and 39 through which it may flow axially into the interior of the rotor. At the juncture of portion 52 and wall 43a, inner rotor section 42 may have an annular surface 63 of smoothly curving cross-section, for directing the liquid smoothly from an axial path to a radial path.

Radially outwardly of the rotor, housing part 13 forms a series of circularly successive teeth 64, against which the liquid discharged by the rotor impinges radially outwardly. Describing the transverse configuration of these teeth, as viewed in the cross-section of FIG. 3, each of the teeth may be defined as having at a first of its sides a surface 65 (typically planar) extending essentially radially outwardly with respect to axis 23. At the opposite side (as viewed in FIG. 3), the tooth has a surface 66 which advances progressively in a circular direction (in the direction of rotor movement) as it advances radially outwardly, and which desirably has a curved cross-section as illustrated in FIG. 3. The cross-section shown in this figure assumes that the rotor is turning in a counterclockwise direction. In such an arrangement in which the rotor turns counterclockwise, the threads of unit 39 are right hand threads, so that the rotor movement tends to tighten the nut.

At its bottom, pipe 13 has a spout portion 67, containing a discharge passage 68 through which homogenized liquid from the interior of part 13 flows downwardly by gravity, to discharge from the spout and into a bowl or other receptacle positioned on the support surface on which stand 11 is located. Spout 67 may extend forwardly and downwardly at an angle, as seen in FIG. 2. Also, it is considered highly desirable that the passage 68 within the spout have a length of at least about two inches, rather than a shorter length, since the increased travel within a two inch spout results in the elimination of much of the air from the liquid as ultimately discharged.

For reception of bowl 14, part 13 contains at the upper end of passage 59 an enlarged diameter counterbore 69, within which a downwardly projecting connector portion 70 of the bowl is receivable. Portion 70 is externally cylindrical, and of a diameter to be fairly close fit within counterbore 69, and carries two rubber O-rings or other seal rings 71 within grooves formed in portion 70 of the bowl. These rings 71 engage surface 69 in a manner effectively preventing vibration of bowl 14 relative to the rest of the device, and also forming a fluid-tight seal preventing the leakage of any fluids at the location of the connection between the bowl and part 13. The bowl is easily connected to the rest of the device and detached therefrom by merely slipping portion 70 downwardly into counterbore 69, or removing portion 70 upwardly from the counterbore.

Internally, the connector portion 70 of bowl 14 has a passage 72 which may be of a diameter corresponding to passage 59, and form a continuation thereof. For preventing the development of swirling motion within bowl 14, as the fluids flow downwardly into passages 72 and 59, there may be provided in the bowl a swirl preventer 73. This element desirably takes the form of a small piece of sheet metal, which may be planar and may be considered as lying in the plane of the paper in FIG. 2, with the cross-section of part 73 being as represented in FIG. 2. More particularly, element 73 may have a downwardly tapering portion 74 of a diameter to be received within the upper portion of passage 72, and carrying an enlarged typically triangularly shaped heads 75. As will be apparent, if there is any tendency for the development of swirling motion of the fluid within bowl 14, the swirling liquid engages the flat element 73, which stops the swirling motion and requires that the liquid flow downwardly into passage 72 without rotation about the axis of that passage. This minimizes the amount of air which flows into the device with the liquid.

To now describe the operation of the homogenizer, assume that the unit is completely assembled as shown in the figures, and that the switch 76 for controlling the motor within the housing 24 is turned to an on operation. This energizes the motor, to commence the rotation of shaft 22 and the carried rotor sections 41 and 42 (as well as nut 39). If the liquid mixture to be homogenized is then filled into bowl 14, the liquid will flow downwardly through passage 72 into passage 59, and then flow horizontally or axially through the annular space within passage 61, and about the shaft, to discharge into the interior of rotor section 42. The annular stream of liquid flows axially along surface 63, and impinges against wall 43a, to flow radially outwardly along that wall and along the outer curving surfce 49a to the inner side of wall 44a. The very rapid rotation of the rotor causes this centrifugal movement of the liquid radially outwardly, and causes the liquid to be thrown outwardly through apertures 51a of rotor section 42. The resultant fine streams or jets or liquid emitting from apertures 51a impinge against the inner surface of wall 44, and then are thrown radially outwardly through apertures 51 in wall 44 and against teeth 64. The passage of the liquid through apertures 51a and against wall 44, then through apertures 51, and against teeth 64, breaks the various constituents of the liquid mixture into minute finely divided particles or droplets, which are so finely divided and so intimately mixed together that the liquid after discharge remains in homogenized form, and does not thereafter separate into the original constituents. The homogenized mixture of course discharges from spout 67 and into a waiting receptacle or bowl, as discussed previously.

In order to clean the apparatus, it is necessary merely to remove bowl 14 from part 13, and loosen thumb screws 57 and nut 39, so that part 13, nut 39, and rotor sections 41 and 42 may all be removed and thoroughly washed.

The provision of curved surfaces 49 and 49a within the rotor sections is a highly desirable feature of the invention, since these surfaces provide for smooth curving flow of the liquid as it reaches the wall 44a or wall 44, during radially outward movement of the liquid, so that there is no undesired turbulence or void condition set up at the juncture of walls 43a and 44a, or walls 43 and 44.

I claim:

1. A homogenizer comprising a hollow rotor structure forming and containing a fluid chamber, means for driving said rotor structure at high velocity about an axis, means for feeding liquid into said chamber in said rotor structure, said structure including a first wall centered essentially about said axis and extending generally radially outwardly therefrom, and a second wall extending generally axially from the periphery of said first wall and containing apertures through which liquid is emitted generally radially outwardly in the form of a series of high velocity jets, said rotor structure having at the juncture of said first and second walls an essentially annular surface of progressively curving axial section to smoothly guide the liquid from said first wall to the second wall, some of said apertures extending through said curving surface.

2. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housing disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxiliary housing and positioned to hold liquid at a level higher than the major portion of said rotor, means carried by said auxiliary housing and forming a passage through which liquid flows by gravity from said container and generally axially into the interior of said rotor from approximately the center of said axially outer wall, said rotor having passages extending generally radially therethrough to centrifugally eject said liquid radially outwardly, said auxiliary housing having a wall disposed about said rotor in spaced relation to, but closely proximate, the rotor and in the path of said ejected liquid, and an outlet carried by said auxiliary housing for discharging said liquid downwardly therefrom by gravity after impingement on said wall.

3. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housnig disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxiliary housing and positioned to hold liquid at a level higher than the major portion of said rotor, means carried by said auxiliary housing and forming a passage through which liquid flows by gravity from said container and generally axially into the interior of said rotor from approximately the center of said axially outer wall, said rotor having two radially spaced generally axially extending circular walls each containing a large number of passages extending generally radially therethrough to centrifugally eject said liquid radially outwardly, said auxiliary housing having a wall disposed about said rotor in spaced relation to, but closely proximate, the rotor and in the path of said ejected liquid, and an outlet carried by said auxiliary housing for discharging said liquid downwardly therefrom by gravity after impingement on said wall.

4. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housing disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxlliary housing and positioned to hold liquid at a level higher than the major portion of said rotor, means carried by said auxiliary housing and forming a passage through which liquid flows by gravity from said container and generally axially into the interior of said rotor from approximately the center of said axially outer wall, said rotor having passages extending generally radially therethrough to centrifugally eject said liquid radially outwardly, said auxiliary housing having a wall disposed about said rotor in spaced relation to, but closely proximate, the rotor and forming a series of circularly spaced teeth in the path of said ejected liquid, and an outlet carried by said auxiliary housing for discharging said liquid downwardly therefrom by gravity after impingement on said wall.

5. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housing disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxiliary housing and positioned to hold liquid at a level higher than the major portion of said rotor, means carried by said auxiliary housing and forming a passage through which liquid flows by gravity from said container and generally axially into the interior of said rotor from approximately the center of said axially outer wall, said last mentioned means including a tube carried by said auxiliary housing forming a discharge end portion of said passage and projecting generally axially into said rotor to deliver liquid thereinto, said rotor having passages extending generally radially therethrough to centrifugally eject said liquid radially outwardly, said auxiliary housing having a wall disposed about said rotor in spaced relation to, but closely proximate, the rotor and in the path of said ejected liquid, and an outlet carried by said auxiliary housing for discharging said liquid downwardly therefrom by gravity after impingement on said wall.

6. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housing disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxiliary housing and positioned to hold liquid at a level higher than the major portion of said rotor, means carried by said auxiliary housing and forming a passage through which liquid flows by gravity from said container and generally axially into the interior of said rotor from approximately the center of said axially outer wall, said last mentioned means including a tube carried by said auxiliary housing forming a discharge end portion of said passage and projecting generally axially into said rotor to deliver liquid thereinto, said shaft projecting into said tube and said passage in the auxiliary housing, said rotor having passages extending generally radially therethrough to centrifugally eject said liquid radially outwardly, said auxiliary housing having a wall disposed about said rotor in spaced relation to, but closely proximate, the rotor and in the path of said ejected liquid, and an outlet carried by said auxiliary housing for discharging said liquid downwardly therefrom by gravity after impingement on said wall.

7. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housing disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxiliary housing and positoned to hold liquid at a level higher than the major portion of said rotor, means carried by said auxiliary housing and forming a passage through which liquid flows by gravity from said container and generally axially into the interior of said rotor from approximately the center of said axially outer wall, said last mentioned means including a tube carried by said auxiliary housing forming a discharge end portion of said passage and projecting generally axially into said rotor to deliver liquid thereinto, said shaft projecting into said tube and said passage in the auxiliary housing, said means detachably connecting said rotor to said shaft including a nut on the shaft received in said passage, said rotor having passages extending generally radially therethrough to centrifugally eject said liquid radially outwardly, said auxiliary housing having a wall disposed about said rotor in spaced relation to, but closely proximate, the rotor and in the path of said ejected liquid, and an outlet carried by said auxiliary housing for discharging said liquid downwardly therefrom by gravity after impingement on said wall.

8. A homogenizer comprising a motor having a main housing disposed thereabout with an end wall, said motor having a shaft projecting through said end wall to an outer side thereof and turning about an axis, a hollow rotor driven by said motor about said axis, means detachably connecting said rotor to said shaft at said outer side of said end wall, an auxiliary housing disposed about said rotor at said outer side of said end wall and forming with said end wall a homogenizing chamber containing the rotor, means for detachably securing said auxiliary housing to said main housing in sealed relation, said auxiliary housing having an axially outer generally transverse wall axially beyond the rotor in a direction away from the motor, a feed container carried and supported by said auxiliary housing and positioned to hold liquid at a level higher than the major portion of said rotor, means carried by said auxiliary housing and forming a passage through which liquid flows by gravity from said container and generally axially into the interior of said rotor from approximately the center of said axially outer wall, said last mentioned means including a tube carried by said auxiliary housing and forming a discharge end portion of said passage and projecting generally axially into said rotor to deliver liquid thereinto, said shaft projecting into said tube and said passage in the auxiliary housing, said means detachably connecting said rotor to said shaft including a nut on the shaft received in said passage, said rotor having two radially spaced generally axially extending circular walls disposed about said shaft and tube and each containing a large number of passages extending generally radially therethrough to centrifugally eject said liquid radially outwardly, said auxiliary housing having a wall disposed about said rotor in spaced relation to, but closely proximate, the rotor and forming a series of circularly spaced teeth in the path of said ejected liquid, and an outlet carried by said auxiliary housing for discharging said liquid downwardly therefrom by gravity after impingement on said wall.

9. A homogenizer comprising a motor having a housing with an end wall, said motor having a shaft projecting through said end wall to an outer side thereof and turning about an axis, means forming with said main housing a chamber through which liquid is to be passed, and a rotor structure removably carried by said shaft, said structure including a first and inner rotor element having a tubular hub disposed about said shaft and having a first wall projecting radially outwardly, said first element having an apertured second wall projecting axially from said first wall and connected thereto at only one end, the opposite end of said first element being open, means for introducing said liquid into said opposite open end of the first element, said rotor structure including a second rotor element having a radially extending wall confined between said end wall of the housing and said radially extending wall of said first element, said second element having an axially extending apertured wall connected at only one end to said radially extending wall of the second element and open at its opposite end and spaced radially outwardly of said apertured wall of the first element.

10. A homogenizer comprising a motor having a housing with an end wall, said motor having a shaft projecting through said end wall to an outer side thereof and turning about an axis, means forming with said main housing a chamber through which liquid is to be passed, and a rotor structure removably carried by said shaft, said structure including a first and inner rotor element having a tubular hub disposed about said shaft and having a first wall projecting radially outwardly, said first element having an apertured second wall projecting axially from said first wall and connected thereto at only one end, the opposite end of said first element being open, means for introducing said liquid into said opposite open end of the first element, said rotor structure including a second rotor element having a radially extending wall confined between said end wall of the housing and said radially extending wall of said first element, said second element having an axially extending apertured wall connected at only one end to said radially extending wall of the second element and open at its opposite end and spaced radially outwardly of said apertured wall of the first element, and a nut detachably connectible onto said shaft and operable to detachably secure said two elements thereon, said first element having a radially inwardly projecting flange at said opposite end thereof containing an opening for receiving said liquid, said second element having a radially inwardly projecting flange at said opposite end thereof removably receiving and engaging said first element to center the two elements relative to one another.

References Cited by the Examiner
UNITED STATES PATENTS

| | | | |
|---|---|---|---|
| 825,317 | 7/1906 | Haskell | 141—339 |
| 977,372 | 11/1910 | Crane | 141—336 X |
| 985,312 | 2/1911 | Woods | 141—336 X |
| 988,149 | 3/1911 | Stussy | 259—107 |
| 1,265,381 | 5/1918 | Ramey | 141—339 |
| 1,483,742 | 2/1924 | Nicol | 259—105 X |
| 2,448,849 | 9/1948 | Wagner | 259—9 X |
| 2,477,533 | 7/1949 | Whiting | 285—347 X |
| 2,482,235 | 9/1949 | Becchia | 259—50 |
| 2,502,022 | 3/1950 | Paul | 259—21 X |
| 2,509,379 | 5/1950 | Vasel | 259—6 X |
| 2,566,555 | 9/1951 | Coulter et al. | 259—96 X |
| 2,839,277 | 6/1958 | Rishoi et al. | 259—9 |
| 3,012,763 | 12/1961 | Martin | 259—9 X |
| 3,029,027 | 4/1962 | Gray | 259—10 X |

FOREIGN PATENTS

| | | |
|---|---|---|
| 945,085 | 6/1956 | Germany. |
| 638,966 | 6/1949 | Great Britain. |

CHARLES A. WILLMUTH, *Primary Examiner.*